(12) United States Patent
Kamiya

(10) Patent No.: US 6,422,104 B2
(45) Date of Patent: Jul. 23, 2002

(54) APPARATUS FOR SETTING SELECTION GATE POSITIONS FOR CHANGE SPEED IN AUTOMATIC GEAR TRANSMISSION

(75) Inventor: Mitsutoshi Kamiya, Kariya (JP)

(73) Assignee: Aisin Ai Co., Ltd., Nishio (JP)

( * ) Notice: Subject to any disclaimer, the term of this patent is extended or adjusted under 35 U.S.C. 154(b) by 0 days.

(21) Appl. No.: 09/770,307

(22) Filed: Jan. 29, 2001

(30) Foreign Application Priority Data

Jan. 27, 2001 (JP) ........................................ 2000-018999

(51) Int. Cl.$^7$ .............................................. F16H 59/00
(52) U.S. Cl. ......................................................... 74/335
(58) Field of Search ............................................ 74/335

(56) References Cited

U.S. PATENT DOCUMENTS 4,938,088 A * 7/1990 Langley et al. ................ 74/335
6,073,509 A * 6/2000 Salecker et al. ............... 74/335
6,116,391 A * 9/2000 Kremmling et al. ........... 74/335

* cited by examiner

Primary Examiner—Dirk Wright
(74) Attorney, Agent, or Firm—Burns, Doane, Swecker & Mathis, LLP

(57) ABSTRACT

For setting selection gate positions for change speed in a gear-shift mechanism of an automatic gear transmission, a first actuator is activated to rotate a shift-and-select lever for shifting one of shift heads engaged therewith in its neutral position to a low or high speed side in a shift direction, and a second actuator is activated to effect movement of the shift-and-select lever in a select direction perpendicular to the shift direction in a condition where the shift head was shifted to the low or high speed side. The second actuator is deactivated when the movement of the shift-and-select lever in the select direction was restricted by engagement with the shift head shifted to the low or high speed side. When the second actuator was deactivated, an output value of a selection-stroke sensor for detecting operation of the second actuator is read out for setting a selection gate position of the shift head shifted to the low or high speed side based thereon.

3 Claims, 8 Drawing Sheets

APPARATUS FOR SETTING SELECTION GATE POSITIONS FOR CHANGE SPEED IN AUTOMATIC GEAR TRANSMISSION

BACKGROUND OF THE INVENTION

1. Field of the Invention

The present invention relates to an automatic gear transmission and more particularly to an apparatus for setting selection gate positions for change speed in a gear-shift mechanism of the automatic gear transmission.

2. Discussion of the Prior Art

In a conventional gear-shift mechanism of an automatic gear transmission including a changeover shaft mounted within a housing of the gear transmission for both axial and rotary movements to be axially shifted from a neutral position to a forward or reverse position in a select direction and to be rotated at its shifted position in shifting operation, a shift-and-select lever fixed to an intermediate portion of the changeover shaft for axial and rotary movements therewith, an interlock member rotatably mounted in place on the changeover shaft and having a pair of interlock arms located at the opposite sides of the shift-and-select lever, detent means for restricting rotary movement of the interlock member and for permitting axial movement of the interlock member, a plurality of fork shafts mounted in parallel within the housing for axial movement in a shift direction perpendicular to the select direction, a plurality of shift forks mounted on the fork shafts to be selectively engaged with each sleeve of a plurality of changeover mechanisms for selectively establishing a plurality of change-speed gear trains in the gear transmission, a plurality of shift heads mounted on the fork shafts to be selectively engaged with the shift-and-select lever at their neutral positions, the shift-and-select lever is selectively engaged with one of the shift heads at a selection gate position and moved to a low or high speed side during which the other shift heads are retained in their neutral positions by engagement with the interlock arms. If the selection gate position was deviated from a proper position for engagement with the selected shift head, the shift-and-select lever would be brought into frictional contact with the other shift head adjacent thereto during movement to the low or high speed side or would not be moved due to contact with the other shift head.

SUMMARY OF THE INVENTION

It is, therefore, a primary object of the present invention to provide an apparatus for accurately setting selection gate positions for change speed in the gear-shift mechanism without causing any problems described above.

According to the present invention, the object is accomplished by providing an apparatus for setting selection gate positions for change speed in a gear-shift mechanism of an automatic gear transmission including a changeover shaft mounted within a housing of the gear transmission for both axial and rotary movements to be axially shifted from a neutral position to a forward or reverse position in a select direction and to be rotated at its shifted position in shifting operation, a shift-and-select lever fixed to an intermediate portion of the changeover shaft for axial and rotary movements therewith, an interlock member rotatably mounted in place on the changeover shaft and having a pair of interlock arms located at the opposite sides of the shift-and-select lever, detent means for restricting rotary movement of the interlock member and for permitting axial movement of the interlock member, a plurality of fork shafts mounted in parallel within the housing for axial movement in a shift direction perpendicular to the select direction, a plurality of shift forks mounted on the fork shafts to be selectively engaged with each sleeve of a plurality of changeover mechanisms for selectively establishing a plurality of change-speed gear trains in the gear transmission, a plurality of shift heads mounted on the fork shafts to be selectively engaged with the shift-and-select lever at their neutral positions, a first actuator operatively connected to the changeover shaft for effecting rotary movement of the changeover shaft when activated under control of an electronic controller, a shift-stroke sensor for detecting operation of the first actuator, a second actuator operatively connected to the changeover shaft for effecting axial movement of the changeover shaft in the select direction when activated under control of the electronic controller, and a selection-stroke sensor for detecting operation of the second actuator, wherein the electronic controller comprises a program memory storing instructions for activating the first actuator such that the shift-and-select lever is rotated to shift one of the shift heads engaged therewith in its neutral position to a low or high speed side in the shift direction, for activating the second actuator to effect movement of the shift-and-select lever with the changeover shaft in the select direction in a condition where the shift head was shifted to the low or high speed side, for deactivating the second actuator when the movement of the shift-and-select lever in the select direction was restricted by engagement with the shift head shifted to the low or high speed side, for reading out an output value of the selection-stroke sensor when the second actuator was deactivated, and for setting a selection gate position of the shift head shifted to the low or high speed side on a basis of the output value of the selection-stroke sensor.

BRIEF DESCRIPTION OF THE DRAWINGS

Other objects, features and advantages of the present invention will be more readily appreciated from the following detailed description of preferred embodiments thereof when taken together with the accompanying drawings, in which.

DESCRIPTION OF THE PREFERRED EMBODIMENT

Figure 1:
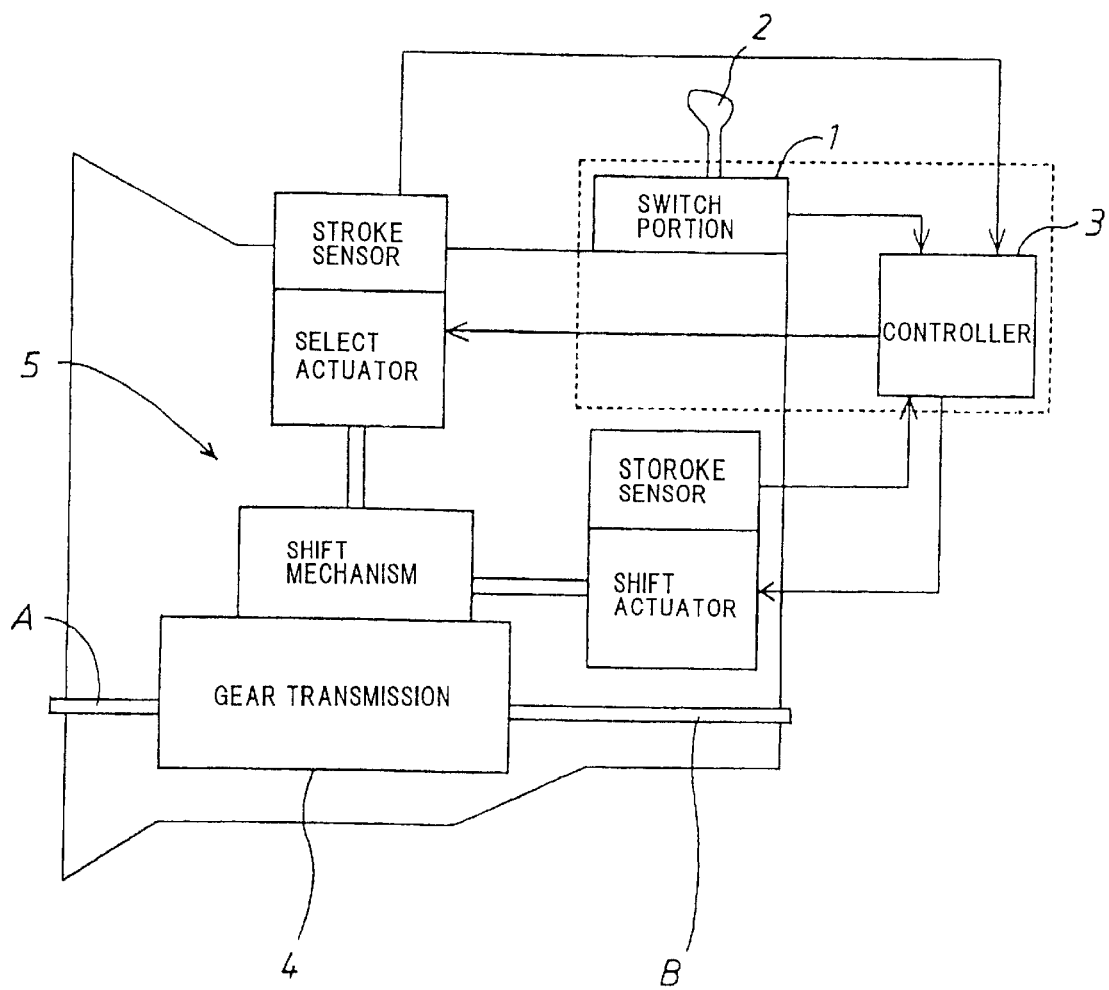
FIG. 1 is a block diagram showing the whole components of an automatic gear transmission in accordance with the present invention.
Figure 2:
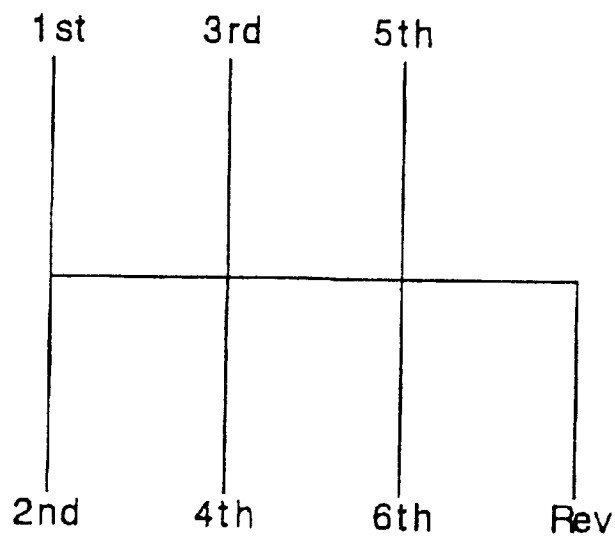
FIG. 2 illustrates a shift-pattern of a gear-shift mechanism in the gear transmission.

In FIG. 1 of the drawings, there is schematically illustrated the whole components of an automatic gear transmission in accordance with the present invention. In FIG. 1, the reference numeral 1 designates a switch portion for detecting a change-speed gear train selected by operation of a manual shift lever 2 and for applying an electric signal indicative of the selected gear train to an electronic controller 3 in the form of a microcomputer for control of the gear transmission. The shift lever 2 is supported in place to be shifted by a driver in a shift-pattern shown in FIG. 2. The reference numeral 4 designates the gear transmission with change-speed gear trains of forward six steps and a reverse step which are changed over by means of a gear-shift mechanism 5.

Figure 3:
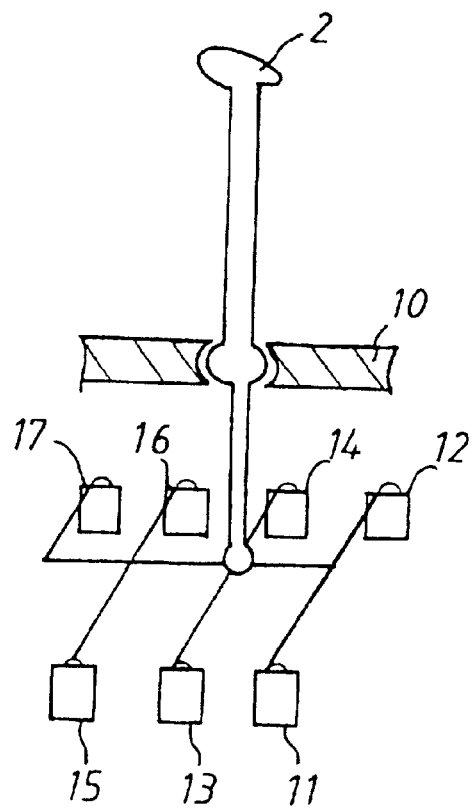
FIG. 3 is a schematic illustration of a group of switches associated with a shift lever in the gear-shift mechanism.

As shown in FIG. 3, the shift lever 2 is mounted on a housing 10 of the gear transmission. The reference numerals 11–17 designate a group of switches mounted within the gear transmission housing 10 and opposed to a lower end of the shift lever 2. The switches 11–17 are connected to the electronic controller 3. When the shift lever 2 is selectively shifted to $1^{st}$ to $6^{th}$ speed positions of the shift pattern shown in FIG. 2, the switches 11–16 are selectively turned on by engagement with the lower end of the shift lever 2. When the shift lever 2 is shifted to a reverse position Rev of the shift pattern, the switch 17 is turned on by engagement with the lower end of the shift lever 2. Thus, when the shift lever 2 is shifted in accordance with the driving condition of the vehicle, a selected gear train is detected by on-operation of either one of the switches 11–17, and an electric signal indicative of the selected gear train is applied to the electronic controller 3.

Figure 4:
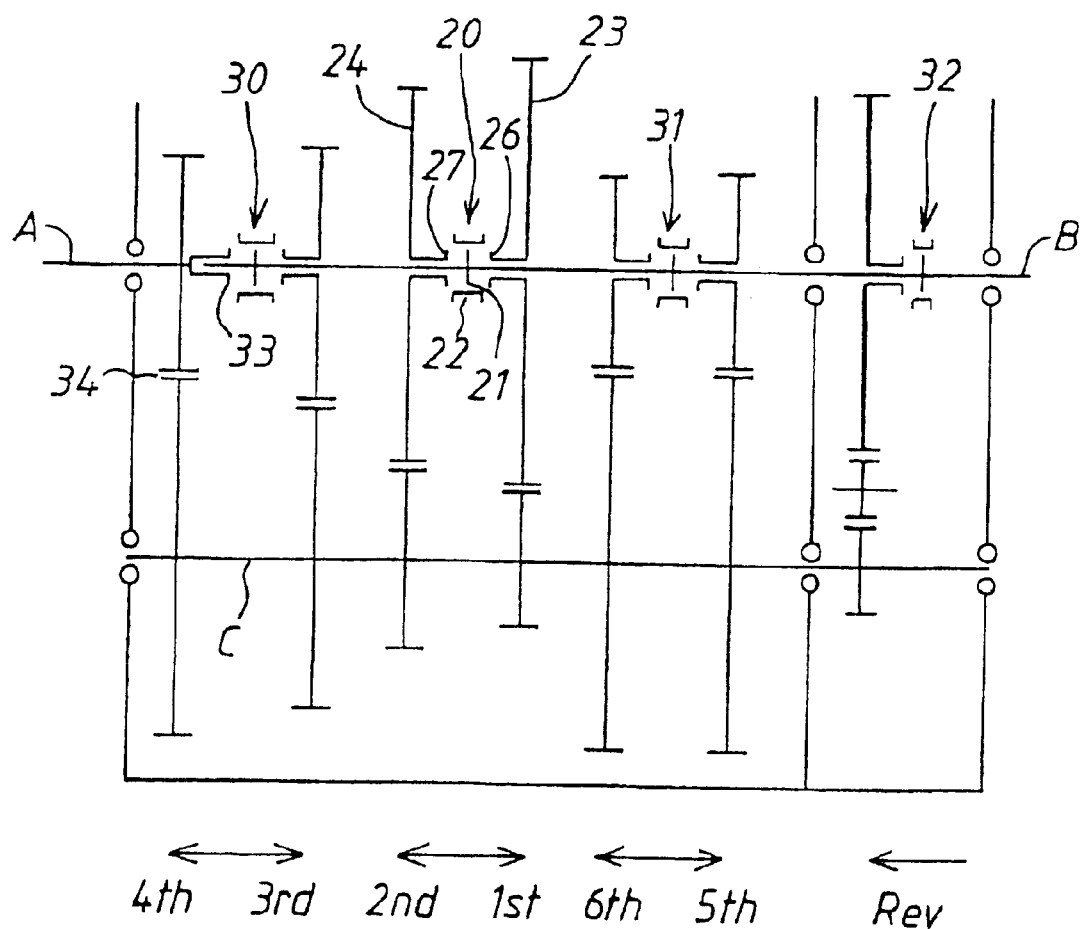
FIG. 4 is a skeleton view illustrating change-speed gear trains in the gear transmission.

As shown in FIG. 4, the gear transmission 4 includes a changeover mechanism 20 in which a sleeve 22 is coupled with a hub member 21 fixed to an output shaft B for reciprocal movement in an axial direction. First and second speed gears 23, 24 are rotatably mounted on the output shaft B at opposite sides of the hub member 21 and positioned in place for transmitting a drive power from an input shaft A to the output shaft B. When shifted to a right-hand first speed position, the sleeve 22 is brought into engagement with a clutch gear 26 fixed to the first speed gear 23 through a synchronizer (not shown) to establish a first speed gear train. When shifted to a left-hand second speed position, the sleeve 22 is brought into engagement with a clutch gear 27 fixed the second speed gear 24 through a synchronizer (not shown) to establish a second speed gear train. When retained in neutral position, the sleeve 22 is disengaged from the clutch gears 26 and 27 to disconnect the first and second speed gears 23 and 24 from the output shaft B. Each sleeve of changeover mechanisms 30 and 31 is mounted on the output shaft B in the same manner as in the changeover mechanism 20 to selectively establish a third or fourth speed gear train and to selectively establish a fifth or sixth speed gear train. Similarly, a sleeve of a changeover mechanism 32 is mounted on the output shaft B to establish a reverse gear train.

When the sleeve of the changeover mechanism 30 for third and fourth speed gears is shifted to a left-hand fourth speed position, the sleeve is brought into engagement with a clutch gear 33 fixed to the input shaft A to establish a direct drive connection between the input and output shafts A and B. A gear train 34 is arranged to provide drive connection between the input shaft A and a counter shaft C. Except for the fourth speed, the rotation of input shaft A is transmitted to the output shaft B through the gear train 34, counter shaft C and the corresponding changeover mechanism.

Figure 5:
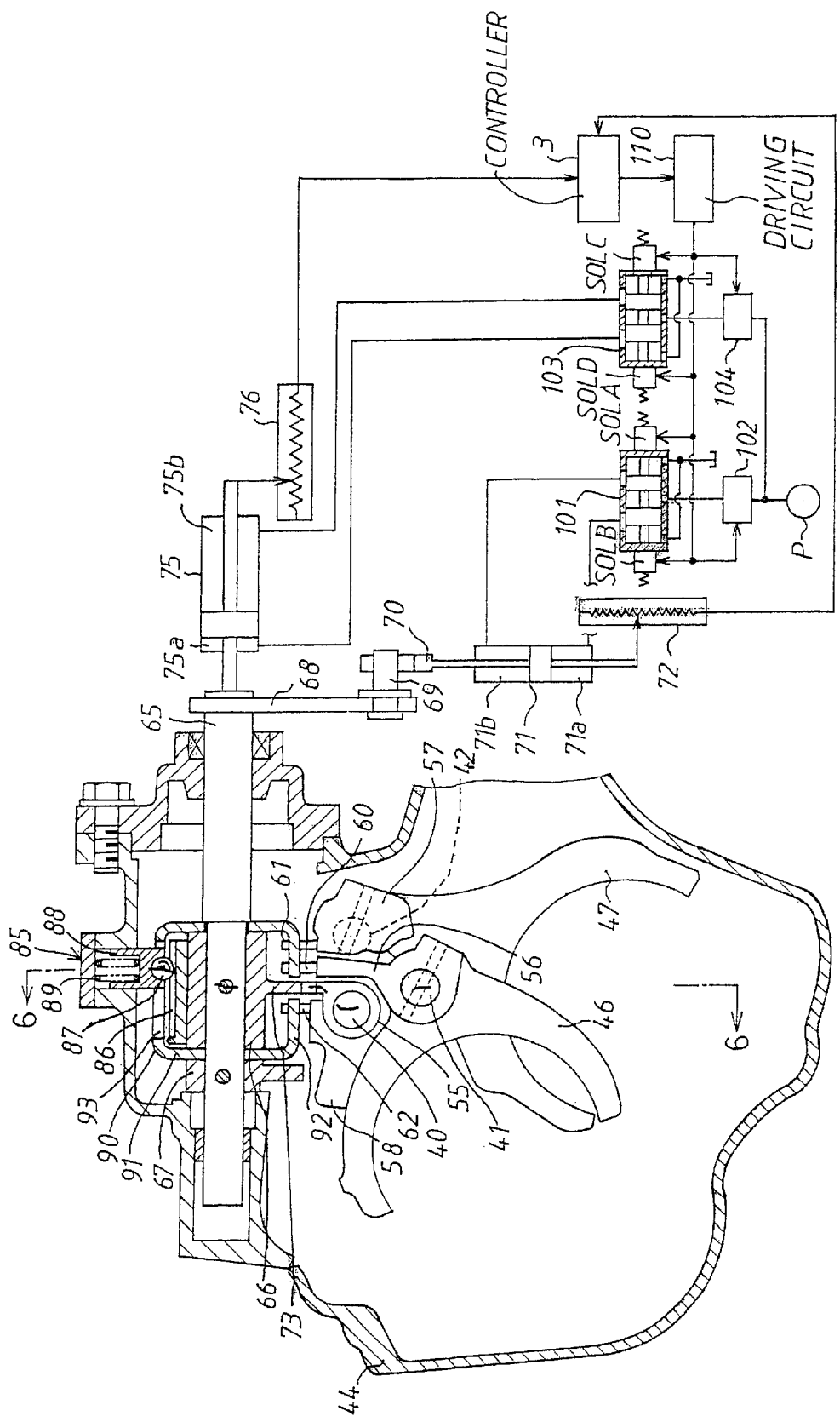
FIG. 5 is a vertical sectional view of the gear-shift mechanism.
Figure 6:
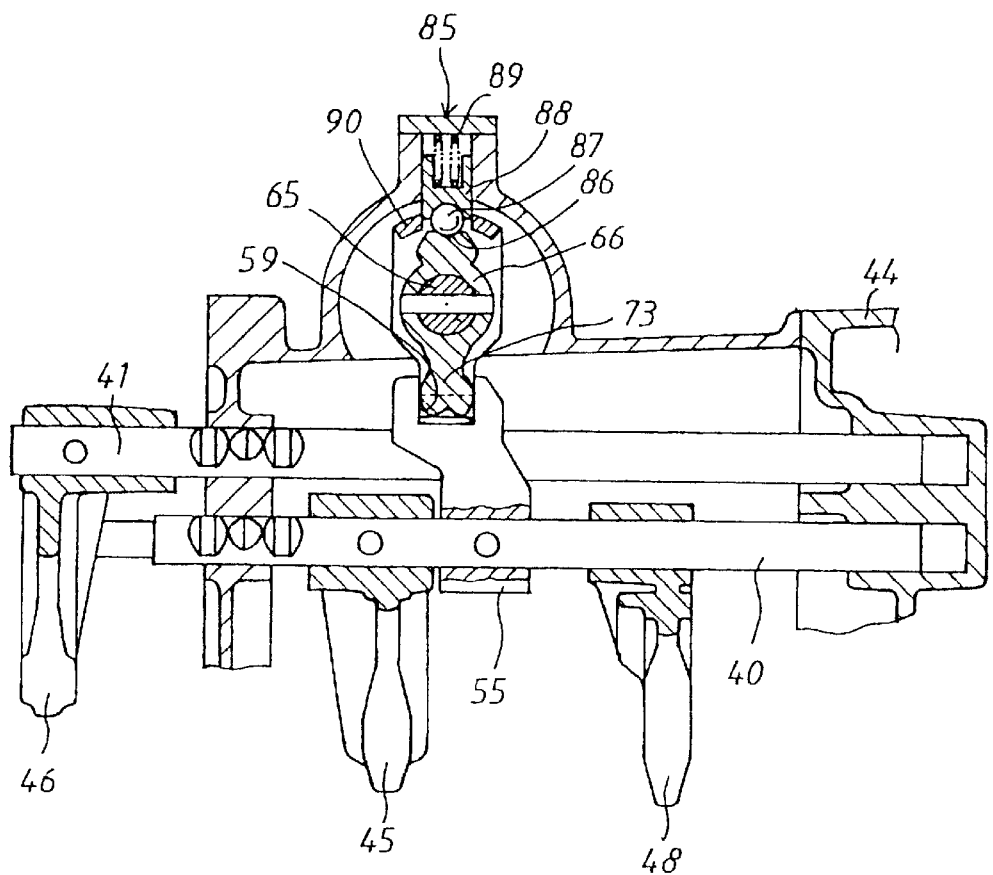
FIG. 6 is a sectional view taken along line 6—6 in FIG. 5.
Figure 7:
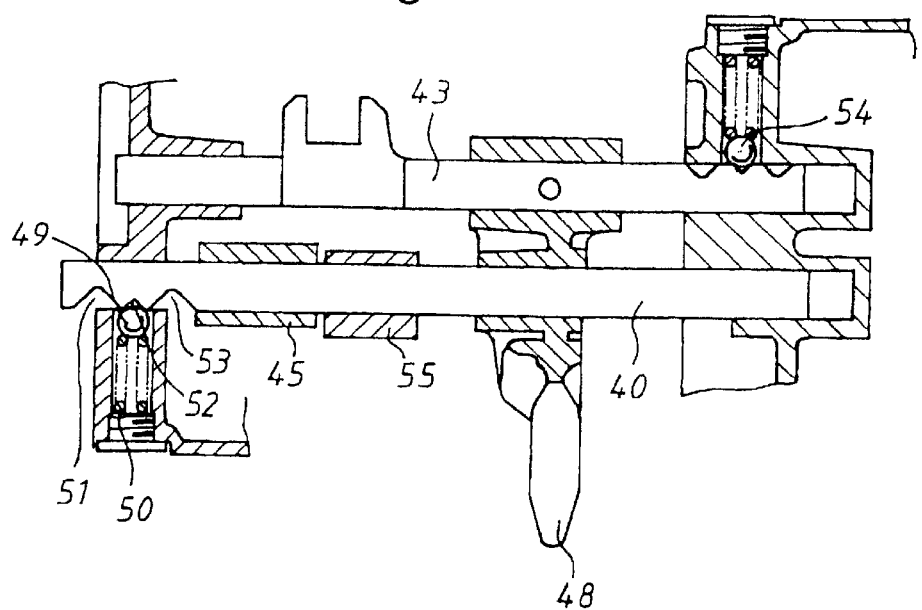
FIG. 7 is a sectional view taken along a fork-shaft for $1^{st}$–$2^{nd}$ speeds and a fork-shaft for reverse drive in the gear transmission.

As shown in FIGS. 5 to 7, the gear-shift mechanism 5 includes a fork shaft 40 for $1^{st}$–$2^{nd}$ speeds, a fork shaft 41 for $3^{rd}$–$4^{th}$ speeds, a fork shaft 42 for $5^{th}$–$6^{th}$ speeds and a fork shaft 43 for reverse drive which are mounted in parallel to each other within an upper portion 44 of the transmission housing 10. As shown in FIG. 6, a shift fork 45 for $1^{st}$–$2^{nd}$ speed is fixed to the fork shaft 40 and maintained in engagement with an annular groove formed on the sleeve 22 of the changeover mechanism 20 to selectively shift the sleeve 22 to the first speed, neutral and second speed portions. As shown in FIG. 7, the fork shaft 40 is formed with recesses 51–53 which are selectively engaged with a detent ball 49 loaded by a coil spring 50 when the fork shaft 40 is selectively shifted to the first speed, neutral and second speed positions. Similarly, shift forks 46 and 47 for $3^{rd}$–$4^{th}$ speeds and for $5^{th}$–$6^{th}$ speeds are respectively fixed to the fork shaft 41 and 42 and maintained in engagement with each annular groove formed on the sleeves of the changeover mechanisms 30 and 31 to selectively shift the sleeves to the third speed, neutral and fourth speed positions and to fifth speed, neutral and sixth speed positions. The fork shafts 41 and 42 are retained in their shifted positions by means of a detent mechanism (not shown) as in the fork shaft 40. As shown in FIG. 7, a shift fork 48 for reverse drive is fixed to the fork shaft 43 and slidably supported by the fork shaft 40 for $1^{st}$–$2^{nd}$ speeds. The shift fork 48 is engaged with an annular groove formed on the sleeve of the changeover mechanism 32. The fork shaft 43 is retained in its shifted position by means of a detect mechanism 54.

Shift heads 55–58 are fixed to the fork shafts 40–43 respectively at the opposite side of the fork shafts. The shift heads 55–58 are formed with recessed portions 59–62 respectively which are selectively brought into engagement with a shift-and-select lever 66. When all the fork shafts 40–43 are retained in their neutral positions, the recessed portions 59–62 of shift heads 55–58 are aligned in a select direction perpendicular to the fork shafts 40–43.

A changeover shaft 65 is mounted within the upper portion 44 of the gear transmission housing 10 for both axial and rotary movements and is placed in the select direction. The shift-and-select lever 66 and a lever 67 for reverse drive are fixed to the changeover shaft 65 and located at the backside of the shift forks 45–48. A drive arm 68 is fixed at one end thereof to a rear end of the changeover shaft 65 and connected at the other end thereof to a drive shaft 69 arranged in parallel with the changeover shaft 65. A drive fork 70 is maintained in engagement with the drive shaft 69 and is moved by a hydraulic actuator 71 to effect rotary movement of the changeover shaft 65. When the changeover shaft 65 is rotated by the drive fork 70, an arm 73 of the shift-and-select lever 66 and the lever 67 for reverse drive are moved in a shift direction parallel with the fork shafts 40–43 to be selectively retained at their low-speed, neutral and high-speed positions. Fluid chambers 71a, 71b of the hydraulic actuator 71 are connected to a hydraulic pump P through a linear solenoid changeover valve 101 and a regulator valve 102. Thus, a shift-drive mechanism is composed of the changeover shaft 65, drive arm 68, drive shaft 69, drive fork 70 and hydraulic actuator 71 for shifting the arm 73 of shift-and-select lever 66 in the shift direction. A shift-stroke sensor 72 is provided as a shift-stroke detection means to detect a displaced position of the piston of hydraulic actuator 71 and to detect a shifted position of the arm 73 of shift-and-select lever 66. An output of the shift-stroke sensor 72 is applied as a feedback signal to the electronic controller 3 through an A-D converter (not shown).

A hydraulic actuator 75 is connected to the rear end of changeover shaft 65 to move the arm 73 of shift-and-select lever 66 in the select direction. Fluid chambers 75a, 75b of hydraulic actuator 75 are connected to the hydraulic pump P through a linear solenoid changeover valve 103 and a regulator valve 104. In a condition where all the fork shafts 40–43 are retained in their neutral positions, the recessed portions 59–62 of shift heads 55–58 are aligned in the select direction to permit the movement of the arm 73 of shift-and-select lever 66 in the select direction. In such a condition, the changeover shaft 65 is moved rightward by activation of the hydraulic actuator 75 to bring the arm 73 of shift-and-select lever 66 selectively into engagement with any one of the recessed portions 59, 60 and 61 of shift heads 55–57 located at gate-positions for $1^{st}$–$2^{nd}$, $3^{rd}$–$4^{th}$ and $5^{th}$–$6^{th}$ speeds. When the changeover shaft 65 is further moved rightward by activation of the hydraulic actuator 75, the lever 67 for reverse drive is brought into engagement with the recessed portion 62 of shift head 58 located at a gate-position for reverse drive. Thus, a select-drive mechanism is composed of the changeover shaft 65 and hydraulic actuator 75 for moving the arm 73 of shift-and-select lever 66 in the select direction. A selection-stroke sensor 76 is provided as a selection-stroke detection means to detect a displaced position of the piston of hydraulic actuator 75 and to detect a shifted position of the arm 73 of shift-and-select lever 66. An output of the selection-stroke sensor 76 is applied as a feedback signal to the electronic controller 3 through an A-D converter (not shown).

A detent mechanism 85 for retaining the shift-and-select lever 66 in its neutral position includes a detent ball 87 in engagement with an axial groove 86 formed on the backside of shift-and-select lever 66 in the select direction, a holder 88 slidably mounted within the upper portion 44 of the gear transmission housing 10 for retaining the detent ball 87 in engagement with the axial groove 86, and a coil spring 89 provided to bias the detent ball 87 toward the backside of shift-and-select lever 66 through the holder 88. An interlock member 90 is formed to enclose the shift-and-select lever 66 and is mounted in place on the changeover shaft 65 to selectively restrict shift movement of the shift heads 55–57. The interlock member 90 is integrally formed at the lower portion thereof with a pair of interlock arms 92 which are located at the opposite sides of the arum 73 of shift-and-select lever 66 to be brought into engagement with the shift heads 55–57. The interlock member 90 is formed at the upper portion thereof with an axial hole 93 in which the holder 88 of detent mechanism 85 extends to restrict rotary movement of the interlock member 90 and to permit axial movement of the interlock member 90 in the select direction.

Assuming that the shift lever 22 has been shifted to the fifth speed position, the switch 15 is turned on by engagement with the lower end of shift lever 22. When applied with an output signal from the switch 15, the electronic controller 3 activates a driving circuit 110 to control the linear solenoid valve 103 in such a manner that the hydraulic actuator 75 is operated to move the changeover shaft 65 rightward in the select direction thereby to bring the arm 73 of shift-and-select lever 66 into engagement with the recessed portion 61 of shift head 57. In this instance, the shifted position of the arm 73 of shift-and-select lever 66 is detected by the selection-stroke sensor 76, and a signal indicative of the detected position is applied as a feedback signal to the electronic controller 3 through the A-D converter. Thus, the arm 73 of shift-and-select lever 66 is accurately engaged with the recessed portion 61 of shift head 57 at the selected gate. When the arm 73 of shift-and-select lever 66 is engaged with the recessed portion 61 of shift head 57, the driving circuit 110 is activated under control of the electronic controller 3 to control the linear solenoid valve 101 in such a manner that the hydraulic actuator 71 is operated to rotate the changeover shaft 65 thereby to shift the arm 73 of shift-and-select lever 66 to the low speed side. Thus, the shift head 57, fork shaft 42 and shift fork 47 are moved to shift the sleeve of the changeover mechanism 31 to the fifth speed position.

Figure 8:
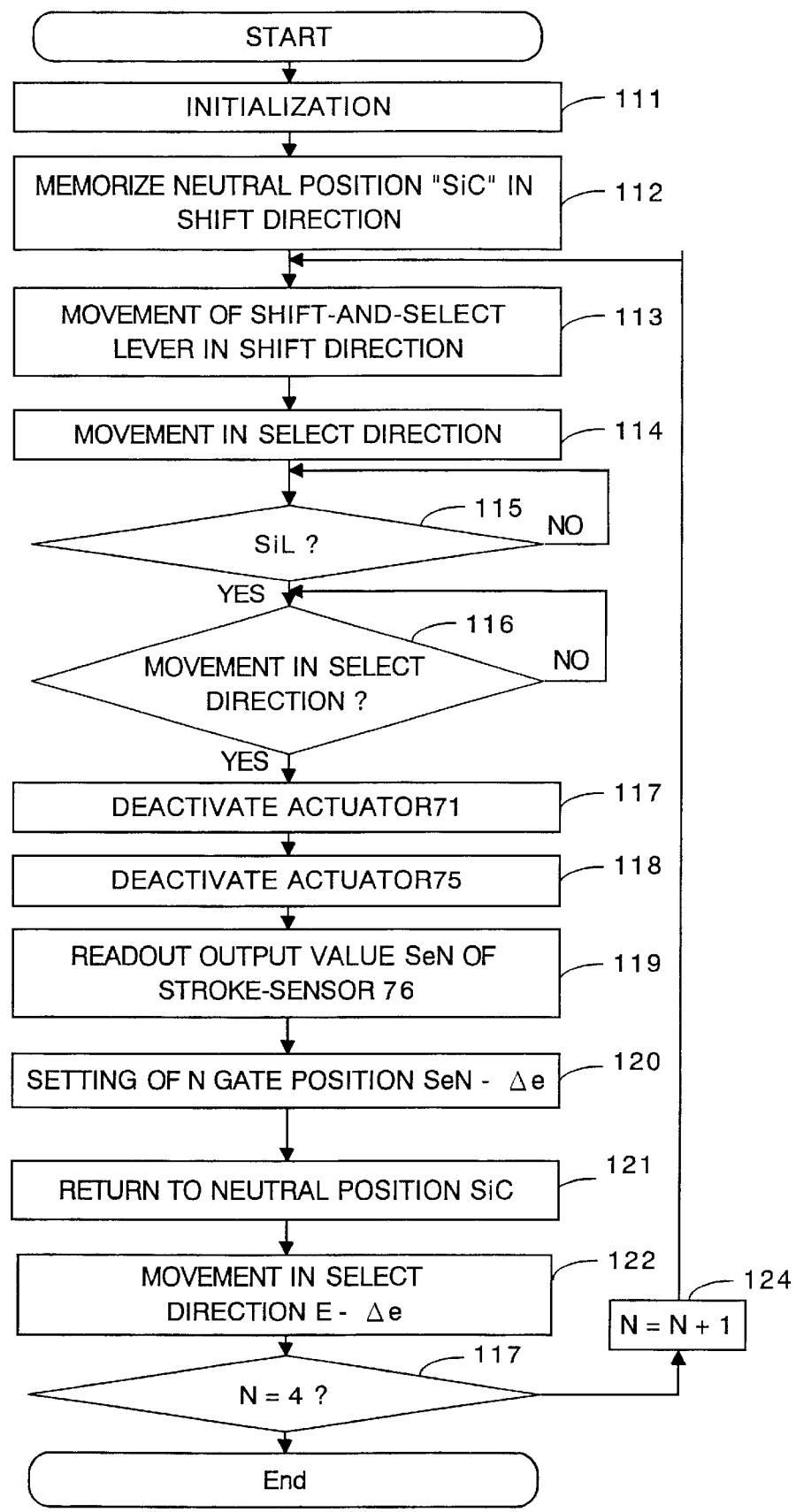
FIG. 8 is a flow chart of a program executed for setting a selection gate position.

To accurately shift the arm 73 of shift-and-select lever 66 to each selection gate for $1^{st}$–$2^{nd}$, $3^{rd}$–$4^{th}$ and $5^{th}$–$6^{th}$ speeds and to accurately shift the lever 67 for reverse drive to a reverse drive gate, it is required to memorize each selection gate position detected by the select-stroke sensor 76 when the arm 73 of shift-and-select lever 66 and the lever 67 for reverse drive have been accurately positioned for the change-speeds and reverse drive during an assembly process of the automatic gear transmission. In this embodiment, each selection gate position for the change-speeds and reverse drive is set by execution of a program shown by a flow chart in FIG. 8 as described hereinafter.

In general, the automatic gear transmission is assembled in such a manner that the fork shafts 40–43 are retained in their neutral positions to align all the recessed portions 59–62 of shift heads 55–57 in the select direction and that the shift-and-select lever 66 is retained in its neutral position to maintain the lever 67 for reverse drive in engagement with an internal wall of the upper portion of transmission housing 10. In such a condition, the arm 73 of shift-and-select lever 66 is engaged with the recessed portion 59 of shift head 55 fixed to the fork shaft 40 for $1^{st}$–$2^{nd}$ speeds and coarsely positioned at a selection gate position for $1^{st}$–$2^{nd}$ speeds.

During the assembly process of the automatic gear transmission described above, the program for setting the selection gate positions is initialized at step 111. In this instance, the linear solenoid valves 101, 103 are deactivated to maintain the hydraulic actuators 71 and 75 respectively in an unloaded condition, and the regulator valves 102 and 104 are set at a low pressure suitable for setting each selection gate position. Thus, the number of the selection gate position is memorized as N=1 in a memory of the electronic controller 3, and an output value of the stroke-sensor 72 is read out by the electronic controller 3 at step 112 for setting a neutral position SiC of the arm 73 of shift-and-select lever 66 in the shift direction.

At step 113, the electronic controller 3 issues an instruction signal for shifting the arm 73 of shift-and-select lever 66 to a low speed side in the shift direction at a low speed, and the driving circuit 110 activates the linear solenoid valve 101 under control of the electronic controller 3 so that the fluid chamber 71a of hydraulic actuator 71 is supplied with fluid under pressure from the pump P to shift the arm 73 of shift-and-select lever 66 to the low speed side. At the following step 114, the electronic controller 3 issues an instruction signal for shifting the arm 73 of shift-and-select lever 66 rightward (to a high speed side) in FIG. 5 in the select direction at a low speed, and the driving circuit 110 activates the linear solenoid valve 103 under control of the electronic controller 3 so that the fluid chamber 75a of hydraulic actuator 75 is supplied with fluid under pressure from the pump P to shift the arm 73 of shift-and-select lever 66 rightward. As the arm 73 of shift-and-select lever 66 at an initial condition is slightly displaced leftward from the proper selection gate position for $1^{st}$–$2^{nd}$ speeds, the right-hand interlock arm 92 is placed in the recessed portion 59 of shift head 55. In such a condition, the movement of the arm 73 of shift-and-select lever 66 in the shift direction is blocked by the right-hand interlock arm 92 when the arm 73 of shift-and-select lever 66 is shifted to the low speed side. When the arm 73 of shift-and-select lever 66 is moved rightward with the interlock member 90 in the select direction, the right-hand interlock arm 92 is disengaged from the recessed portion 59 of shift head 55, and the arm 73 of shift-and-select lever 66 is shifted to the low speed side.

When the arm 73 of shift-and-select lever 66 is further moved rightward by operation of the hydraulic actuator 75, the rightward movement of left-hand interlock arm 92 is restricted by engagement with the shift head 55 for $1^{st}$–$2^{nd}$ speeds shifted to the low speed side. The shift of the arm 73 of shift-and-select lever 66 to the low speed side is read out by the electronic controller 3 based on the output value of stroke sensor 72 and determined at step 115 by the fact that a low speed position SiL added with a space between the neutral position and the low speed position becomes the neutral position SiC previously memorized. The shift of the arm 73 of shift-and-select lever 66 may be determined by the fact that the output value of stroke-sensor 72 does not change despite of lapse of a predetermined time Δt. The fact that the rightward movement of left-hand interlock arm 92 in the select direction was restricted by engagement with the shift head 55 is determined by the fact that the output value of stroke-sensor 76 does not change despite of lapse of the predetermined time Δt.

When the shift of the arm 73 of shift-and-select lever 66 to the low speed side is confirmed, the linear solenoid valve 101 is deactivated under control of the electronic controller 3 at step 117, and the hydraulic actuator 71 is unloaded. When the engagement of the left-hand interlock arm 92 with the shift head 55 is confirmed, the linear solenoid valve 103 is deactivated under control of the electronic controller 3 at step 118, and the hydraulic actuator 75 is unloaded to release resilient deformation of the interlock member 91, shift head 55 and fork shaft 40. In such a condition, an output value Sel of stroke sensor 76 is memorized in the memory of electronic controller 3 at step 119. Thus, a difference Δe between the position of the interlock arm 92 in engagement with the shift head 55 and the selection gate position for $1^{st}$–$2^{nd}$ speeds is subtracted from the output value Sel of stroke-sensor 76, and a resultant value Sel–Δe of the subtraction is memorized as the selection gate position for $1^{st}$–$2^{nd}$ speeds in the memory of electronic controller 3 at step 120. At step 121, the linear solenoid valve 101 is activated under control of the electronic controller 3 to supply fluid under pressure into the fluid chamber 71b of hydraulic actuator 71 thereby to return the arm 73 of shift-and-select lever 66 to the neutral position. The return of shift-and-select lever 66 to the neutral position is confirmed by the fact that the output value of stroke-sensor 72 becomes SiC.

For positioning the arm 73 of shift-and-select lever 66 in the selection gate position for $3^{rd}$–$4^{th}$ speeds, the electronic controller 3 issues at step 122 an instruction signal for moving the arm 73 of shift-and-select lever 66 rightward in a distance E–Δe defined by a difference between a distance E spaced from the selection gate position and the difference Δe described above. When applied with the instruction signal, the linear solenoid valve 103 is activated under control of the controller 3 to supply fluid under pressure into the fluid chamber 75a of hydraulic actuator 75 thereby to move the arm 73 of shift-and-select lever 66 rightward. When the rightward movement of shift-and-select lever 66 in the distance E–Δe is confirmed by the output value of stroke-sensor 76, the linear solenoid valve 103 is deactivated under control of the electronic controller 3. In this instance, the controller 3 determines whether the number of the memorized selection gate position is defined as N=4 or not. As the answer is "No", the content of the memory is set as N=2. Subsequently, the electronic controller 3 repeats the execution of processing at step 113–124 for setting each selection gate position for $3^{rd}$–$4^{th}$ speeds, $5^{th}$–$6^{th}$ speeds and reverse drive in the same manner as described above. When the selection gate position for reverse drive has been set, the number of the selection gate position memorized in the memory is defined as N=4, and the execution of the program for setting the selection gate positions is finished.

Figure 9:
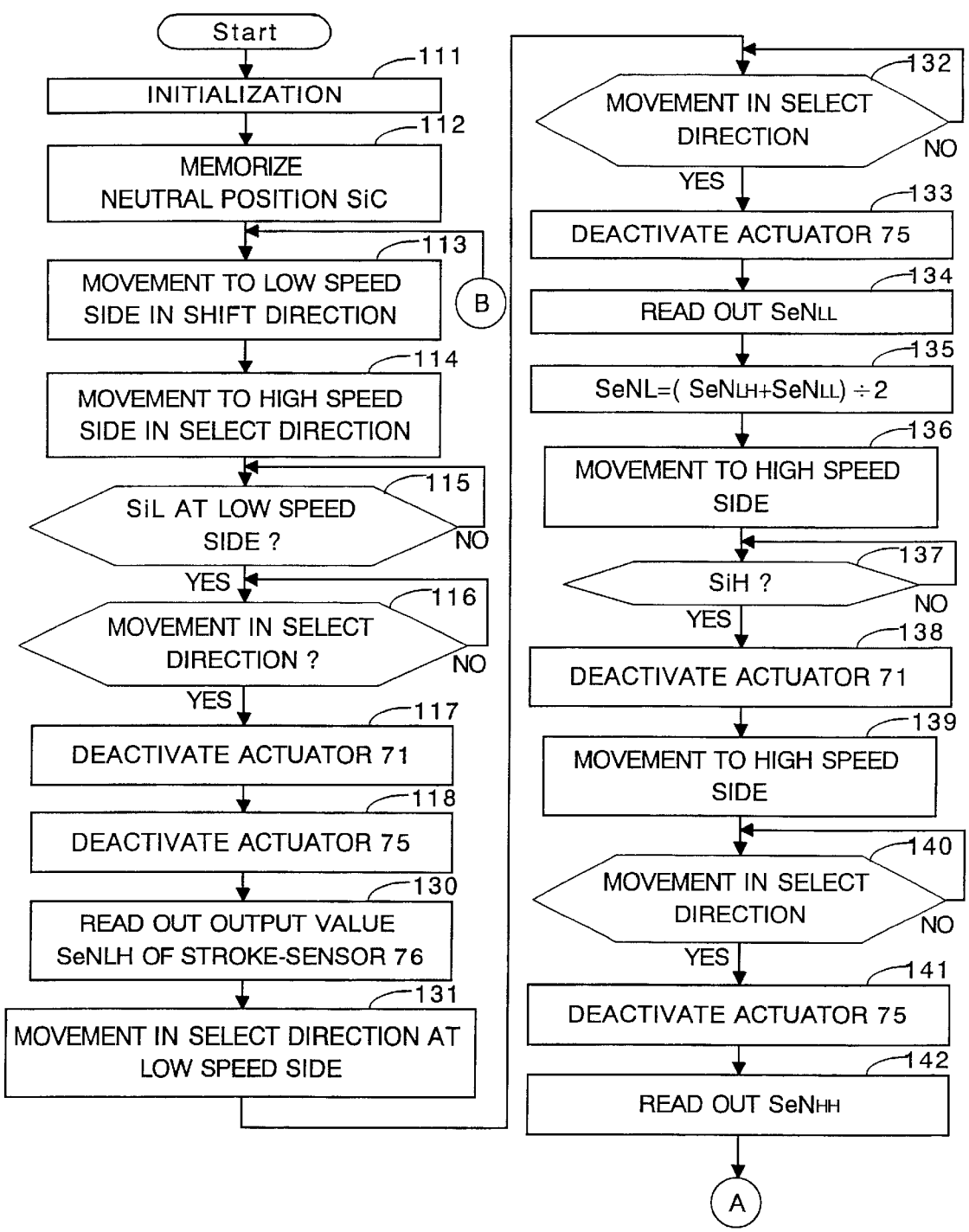
FIG. 9 is a flow chart of a first part of a modification of the program shown in FIG. 8.
Figure 10:
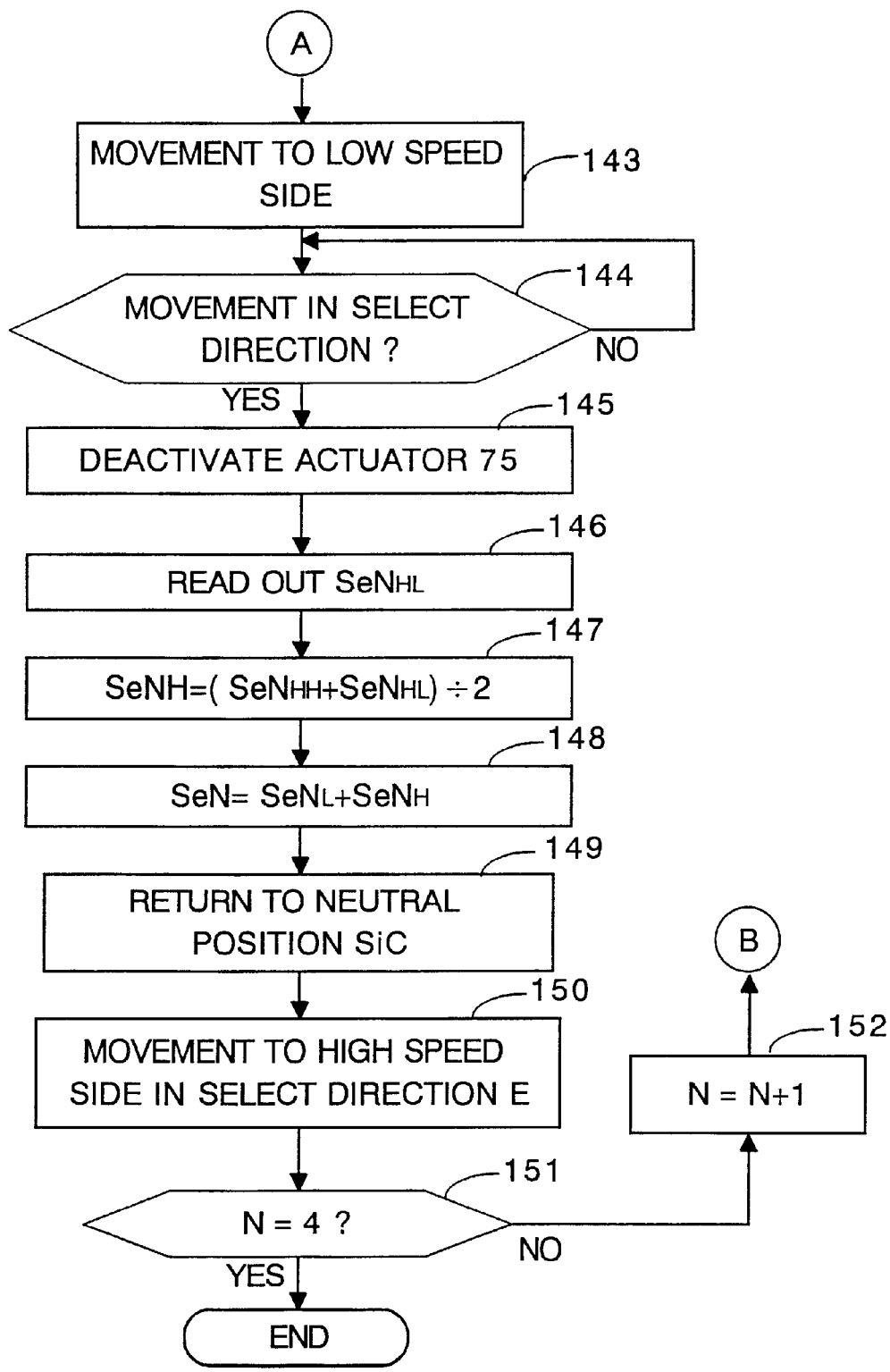
FIG. 10 is a flow chart of a second part of the modification of the program.

Hereinafter, a modification of the program for setting the selection gate positions will be described with reference to flow charts shown in FIGS. 9 and 10. Assuming that the engagement of the left-hand interlock arm 92 with the shift head 55 has been confirmed at step 116, the linear solenoid valve 103 is deactivated at step 118 under control of the electronic controller 3. In this instance, the controller 3 reads out an output value $Sel_{LH}$ of stroke-sensor 76 at step 130 and issues at step 131 an instruction signal for moving the arm 73 of shift-and-select lever 66 leftward in FIG. 5 in the select direction at a low speed. In response to the instruction signal, the driving circuit 110 activates the linear solenoid valve 103 under control of the controller 3 to supply fluid under pressure into the fluid chamber 75b of hydraulic actuator 75 for moving the arm 73 of shift-and-select lever 66 leftward. When the arm 73 of shift-and-select lever 66 is moved leftward, movement of right-hand interlock arm 92 in the select direction is restricted by engagement with the shift head 55 for $1^{st}$–$2^{nd}$ speeds shifted to the low speed side. The fact that the movement of shift-and-select lever 66 in the select direction has been restricted is determined at step 132 by the fact that the output value of stroke-sensor 76 does not change despite of lapse of the predetermined time. When the engagement of right-hand interlock arm 92 with the shift head 55 is confirmed, the linear solenoid valve 103 is deactivated under control of the electronic controller 3, and the hydraulic actuator 75 is unloaded at step 133 to release resilient deformation of the interlock member 91, shift head 55 and fork shaft 40. In such a condition, the output value $Sel_{LL}$ of stroke-sensor 76 is memorized in the memory of controller 3 at step 134. Thus, an average value $Sel_L$ of the output values $Sel_{LH}$ and $Sel_{LL}$ is calculated as a first gate position at the low speed side at step 135.

At step 136, the electronic controller 3 issues an instruction signal for shifting the arm 73 of shift-and-select lever 66 to a high speed side in the shift direction at a low speed. In response to the instruction signal, the driving circuit 110 activates the linear solenoid valve 101 under control of the controller 3 to supply fluid under pressure into the fluid chamber 71b of hydraulic actuator 71 thereby to shift the shift-and-select lever 66 to the high speed side. The shift of the arm 73 of shift-and-select lever 66 to the high speed side is read out by the electronic controller 3 based on an output value of stroke sensor 72 and determined at step 137 by the fact that a high speed position SiH added with a space between the neutral position and the high speed position becomes the neutral position SiC previously memorized. The shift of the arm 73 of shift-and-select lever 61 may be determined by the fact that the output value of stroke-sensor 72 does not change despite of lapse of the predetermined time Δt.

When the shift of the arm 73 of shift-and-select lever 66 to the high speed side is confirmed, the linear solenoid valve 101 is deactivated under control of the electronic controller 3, and the hydraulic actuator 71 is unloaded at step 138. Subsequently, the electronic controller 3 issues at step 139 an instruction signal for moving the arm 73 of shift-and-select lever 66 rightward in FIG. 5 in the select direction at a low speed. In response to the instruction signal, the driving circuit 110 activates the linear solenoid valve 103 to supply fluid under pressure into the fluid chamber 75a of hydraulic actuator 75 thereby to move the arm 73 of shift-and-select lever 66 rightward. In this instance, the rightward movement of shift-and-select lever 66 is restricted by engagement with the shift head 55 for $1^{st}$–$2^{nd}$ speeds shifted to the high speed side. The restriction of rightward movement of shift-and-select lever 66 is determined at step 140 by the fact that the output value of stroke-sensor 76 does not change despite of lapse of the predetermined time Δt. When the engagement of the left-hand interlock arm 92 with the shift head 55 is confirmed, the linear solenoid valve 103 is deactivated under control of the controller 3, and the hydraulic actuator 75 is deactivated at step 141. In such a condition, the output value $Sel_{HH}$ of stroke-sensor 76 is memorized in the memory of electronic controller 3 at step 142.

At the following step 143, the electronic controller 3 issues an instruction signal for moving the arm 73 of shift-and-select lever 66 leftward in FIG. 5 in the select direction at a low speed. In response to the instruction signal, the driving circuit 110 activates the linear solenoid valve 103 to supply fluid under pressure into the fluid chamber 75b of hydraulic actuator 75 thereby to shift the arm 73 of shift-and-select lever 66 leftward. In this instance, the leftward movement of right-hand interlock arm 92 is restricted by engagement with the shift head 55 for $1^{st}$–$2^{nd}$ speeds shifted to the high speed side. The restriction of leftward movement of right-hand interlock arm 92 is determined at step 144 by the fact that the output value of stroke-sensor 76 does not change despite of lapse of the predetermined time Δt. When the engagement of right-hand interlock arm 92 with the shift head 55 is confirmed, the linear solenoid valve 103 is deactivated under control of the electronic controller 3, and the hydraulic actuator 75 is unloaded at step 145. In such a condition, an output value $Sel_{HL}$ of stroke sensor 76 is memorized in the memory of controller 3 at step 146, and an average value $Sel_H$ of the output values $Sel_{HH}$ and $Sel_{HL}$ is calculated as a first gate position at the high speed side at step 147. Thus, an average value Sel of the value SelL indicative of the first gate position at the low speed side and the value SelH indicative of the first gate position at the high speed side is memorized as the selection gate position for $1^{st}$–$2^{nd}$ speeds in the memory of controller 3 at step 148.

At the following step 149, the linear solenoid valve 101 is activated under control of the electronic controller 3 to supply fluid under pressure into the fluid chamber 71 a of hydraulic actuator 71 thereby to shift the arm 73 of shift-and-select lever 66 to the neutral position until the output value of stroke-sensor 72 becomes the value indicative of the neutral position SiC. Subsequently, the electronic controller 3 issues at step 150 an instruction signal for positioning the arm 73 of shift-and-select lever 66 in the selection gate position for $3^{rd}$–$4^{th}$ speeds. When applied with the instruction signal, the driving circuit 110 activates the linear solenoid valve 103 to supply fluid under pressure into the fluid chamber 75a of hydraulic actuator 75 thereby to shift the arm 73 of shift-and-select lever 66 rightward. When the arm 73 of shift-and-select lever 66 is shifted rightward in a distance E spaced from the adjacent selection gate position in the select direction, the linear solenoid valve 103 is deactivated under control of the controller 3, and the hydraulic actuator 71 is unloaded. Thus, the electronic controller 3 determines at step 151 whether the number of the memorized selection gate position is defined as N=4 or not. As the answer is "No", the content of the memory is set as N=2. Subsequently, the electronic controller 3 repeats the execution of processing at step 113–152 for setting each selection gate position for $3^{rd}$–$4^{th}$ speeds, $5^{th}$–$6^{th}$ speeds and reverse drive in the same manner as described above. When the selection gate position for reverse drive has been set, the number of the selection gate position memorized in the memory is defined as N=4, and the execution of the program for setting the selection gate positions is finished.

Since in the modification, the movement ends of the arm 73 of shift-and-select lever 66 to the high and low speed sides at each selection gate position for change speed are detected for setting a center of the movement ends as the selection gate position, accurate setting of the selection gate position can be effected. In the modification, the selection gate positions at the low and high speed sides are calculated for setting an average value of them as each selection gate position. This is useful for setting each selection gate position properly at the low and high speed sides.

What is claimed is:

1. An apparatus for setting selection gate positions for change speed in a gear-shift mechanism of an automatic gear transmission including a changeover shaft mounted within a housing of the gear transmission for both axial and rotary movements to be axially shifted from a neutral position to a forward or reverse position in a select direction and to be rotated at its shifted position in shifting operation, a shift-and-select lever fixed to an intermediate portion of the changeover shaft for axial and rotary movements therewith, an interlock member rotatably mounted in place on the changeover shaft and having a pair of interlock arms located at the opposite sides of the shift-and-select lever, detent means for restricting rotary movement of the interlock member and for permitting axial movement of the interlock member, a plurality of fork shafts mounted in parallel within the housing for axial movement in a shift direction perpendicular to the select direction, a plurality of shift forks mounted on the fork shafts to be selectively engaged with each sleeve of a plurality of changeover mechanisms for selectively establishing a plurality of change-speed gear trains in the gear transmission, a plurality of shift heads mounted on the fork shafts to be selectively engaged with the shift-and-select lever at their neutral positions, a first actuator operatively connected to the changeover shaft for effecting rotary movement of the changeover shaft when activated under control of an electronic controller, a shift-stroke sensor for detecting operation of the first actuator, a second actuator operatively connected to the changeover shaft for effecting axial movement of the changeover shaft in the select direction when activated under control of the electronic controller, and a selection-stroke sensor for detecting operation of the second actuator, wherein the electronic controller comprises a program memory storing instructions for activating the first actuator such that the shift-and-select lever is rotated to shift one of the shift heads engaged therewith in its neutral position to a low or high speed side in the shift direction, for activating the second actuator to effect movement of the shift-and-select lever with the changeover shaft in the select direction in a condition where the shift head was shifted to the low or high speed side, for deactivating the second actuator when the movement of the shift-and-select lever in the select direction was restricted by engagement with the shift head shifted to the low or high speed side, for reading out an output value of the selection-stroke sensor when the second actuator was deactivated, and for setting a selection gate position of the shift head shifted to the low or high speed side on a basis of the output value of the selection-stroke sensor.

2. An apparatus for setting selection gate positions for change speed in a gear-shift mechanism as claimed in claim 1, wherein the program memory of the electronic controller is arranged to store instructions for activating the second actuator to effect movement of the interlock member with the changeover shaft in the selection direction in a condition where the shift head was shifted to the low or high speed side, for deactivating the second actuator when the movement of the interlock member in the select direction was restricted by engagement with the shift head shifted to the low or high speed side.

3. An apparatus for setting selection gate positions for change speed in a gear-shift mechanism as claimed in claim 1, wherein the first and second actuators each are in the form of a hydraulic actuator.

* * * * *